(12) United States Patent
Park et al.

(10) Patent No.: US 9,690,618 B2
(45) Date of Patent: Jun. 27, 2017

(54) METHOD FOR TASK SCHEDULING AND ELECTRONIC DEVICE USING THE SAME

(71) Applicant: Samsung Electronics Co., Ltd., Suwon-si, Gyeonggi-do (KR)

(72) Inventors: Hyunjin Park, Suwon-si (KR); Dohyoung Kim, Suwon-si (KR); Joohwan Kim, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 14/789,613

(22) Filed: Jul. 1, 2015

(65) Prior Publication Data

US 2016/0004564 A1    Jan. 7, 2016

(30) Foreign Application Priority Data

Jul. 2, 2014 (KR) .................. 10-2014-0082711

(51) Int. Cl.
  *G06F 9/46*   (2006.01)
  *G06F 9/48*   (2006.01)
  *G06F 9/50*   (2006.01)

(52) U.S. Cl.
  CPC .......... *G06F 9/4868* (2013.01); *G06F 9/4881* (2013.01); *G06F 9/50* (2013.01)

(58) Field of Classification Search
  CPC ......... G06F 9/4868; G06F 9/4881; G06F 9/50
  USPC ........................................... 718/103
  See application file for complete search history.

(56) References Cited

U.S. PATENT DOCUMENTS

| | | | | |
|---|---|---|---|---|
| 2006/0112394 | A1* | 5/2006 | Asai | G06F 9/45537 718/108 |
| 2008/0320487 | A1* | 12/2008 | Fontenot | G06F 9/505 718/105 |
| 2009/0312856 | A1* | 12/2009 | Jong | G06F 9/4887 700/94 |
| 2013/0219405 | A1* | 8/2013 | Lee | G06F 9/505 718/105 |
| 2014/0173623 | A1* | 6/2014 | Chang | G06F 9/5088 718/105 |

OTHER PUBLICATIONS

Dopplinger, Alexandra, "Industrial Control and Networking Roadmap," Jul. 2009, Freescale Semiconductor, p. 1-40.*
York, Richard, "Benchmarking in context: Dhrystone," Mar. 2002, ARM Ltd., p. 1-7.*

* cited by examiner

*Primary Examiner* — Qing Chen
(74) *Attorney, Agent, or Firm* — Jefferson IP Law, LLP (57) ABSTRACT

A method for task scheduling and an electronic device using the same are provided. The method for scheduling tasks in an electronic device includes assigning a task to one of first processing units functionally connected to the electronic device, measuring a task load of the task, and controlling migration of the task to one of second processing units functionally connected to the electronic device based on the task load.

14 Claims, 9 Drawing Sheets

$$\text{Load 1} = \text{Raw load 1} * \frac{\text{Core 1 current frequency}}{\text{Core 1 max frequency}}$$

<510>

$$\text{Load 2} = \text{Raw load 2} * \frac{\text{Core 2 current frequency}}{\text{Core 2 max frequency}}$$

METHOD FOR TASK SCHEDULING AND ELECTRONIC DEVICE USING THE SAME

CROSS-REFERENCE TO RELATED APPLICATION(S)

This application claims the benefit under 35 U.S.C. §119 (a) of a Korean patent application filed on Jul. 2, 2014 in the Korean Intellectual Property Office and assigned Serial number 10-2014-0082711, the entire disclosure of which is hereby incorporated by reference.

TECHNICAL FIELD

The present disclosure relates to a method for task scheduling in a multiprocessor system environment and an electronic device using the method.

BACKGROUND

With recent advances in the processor technology, single-core processors have evolved into multi-core processors. A multi-core processor may increase execution performance of an application by running tasks on different cores according to the task load.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a task scheduling method reflecting actual core performance wherein the Dhrystone million instructions per second (DMIPS) value serving as a representative metric for core performance is used for task load measurement.

In a multiprocessor system, one operating system determines the order of execution of processors through scheduling to process multiple tasks.

In particular, one core executing a task may be switched to instead use another core according to the load of the task. To measure the task load, a scaling factor based on the frequency may be used to scale raw load values.

However, task scheduling using frequency-based task load may fail to reflect actual processor performance. This is because processors operating at the same frequency may differ in terms of task processing speed according to their types.

In accordance with an aspect of the present disclosure, a method for scheduling tasks in an electronic device is provided. The method includes assigning a task to one of first processing units functionally connected to the electronic device, measuring a task load of the task, and controlling migration of the task to one of second processing units based on the task load.

In accordance with another aspect of the present disclosure, an electronic device is provided. The electronic device includes first processing units, second processing units, a scheduler to assign a task to one of the first processing units, and a load measurement module to measure a task load of the task, wherein the scheduler controls migration of the task to one of the second processing units based on the task load.

In accordance with yet another aspect of the present disclosure, a non-transitory computer readable storage medium storing program instructions implementing a task scheduling method for an electronic device is provided. The program instructions are configured to, when executed, assign a task to one of first processing units functionally connected to the electronic device, measure a task load of the task, and control migration of the task to one of second processing units functionally connected to the electronic device based on the task load.

In accordance with still another aspect of the present disclosure, a method for scheduling tasks in an electronic device is provided. The method includes assigning a task to one of first processing units functionally connected to the electronic device, measuring a task load of the task, and controlling migrations of the task between the one of the first processing units and one of second processing units based on the task load.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a Digital Versatile Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), an Flight Data Recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

Figure 1:
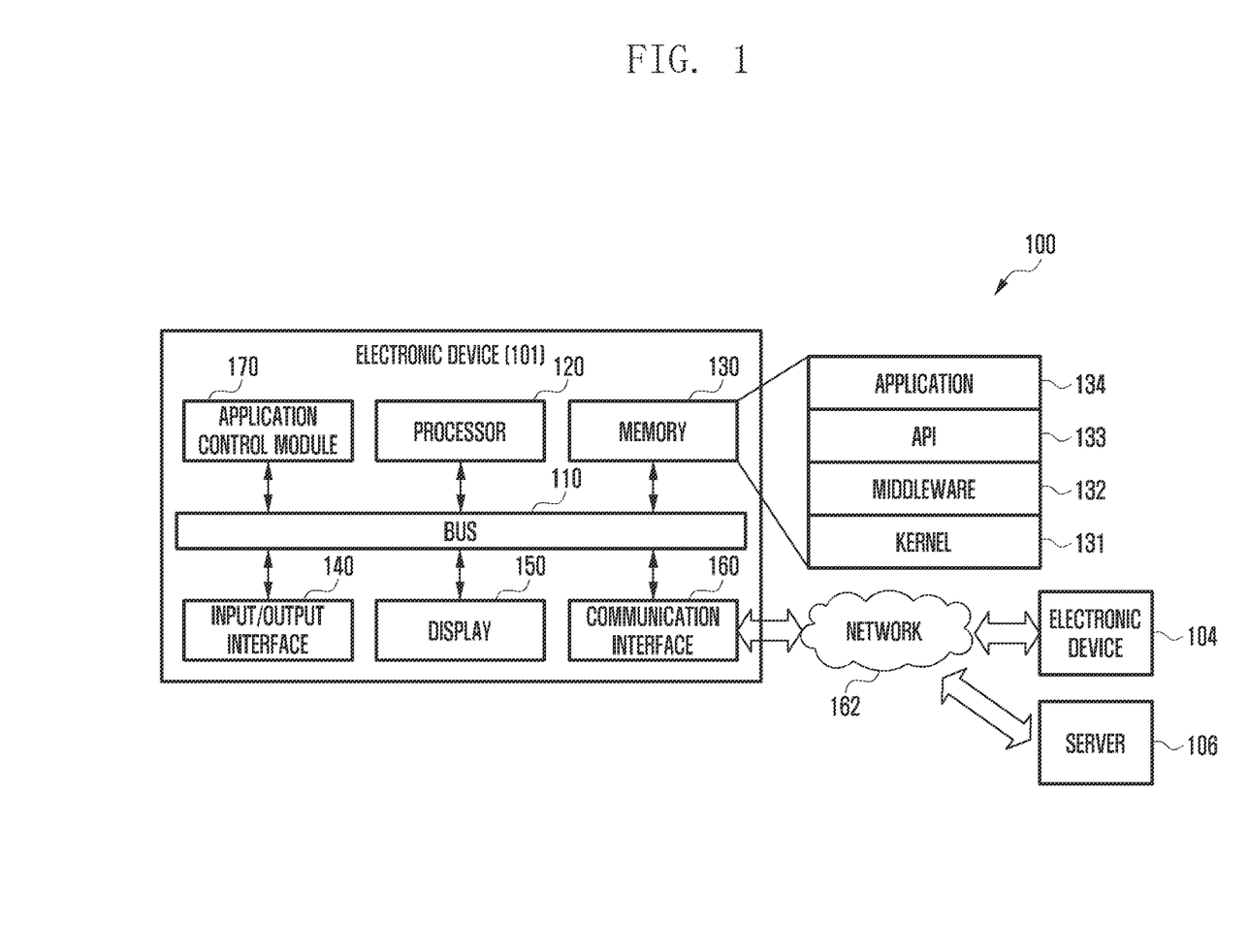
FIG. 1 illustrates a network environment including electronic devices according to according to an embodiment of the present disclosure.

FIG. 1 is a block diagram illustrating a network environment 101 including therein an electronic device 100 according to an embodiment of the present disclosure.

Referring to FIG. 1, the electronic device 100 may include, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, or any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 100.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 100 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include a Short Message Service/Multimedia Messaging Service (SMS/MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 100 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 100 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 100, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in the case that an external electronic device is an MP3 player, the application 134 may include a specific application associated with playing music. Similarly, in the case that an external electronic device is a portable medical device, the application 134 may include a specific application associated with a health care. In an embodiment, the application 134 may include at least one of an application assigned to the electronic device 100 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 100 and any external electronic device (e.g., the electronic device 104 or the server 106). For example, the communication interface 160 may communicate with any external device by being connected with a network 162 through a wired or wireless communication. A wireless communication may include, but not limited to, at least one of WiFi, Bluetooth (BT), Near Field Communication (NFC), GPS, or a cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM), etc.). A wired communication may include, but not limited to, at least one of Universal Serial Bus (USB), High Definition Multimedia Interface (HDMI), Recommended Standard 232 (RS-232), or Plain Old Telephone Service (POTS).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 100 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 100, store such information in the memory 130, and execute the application 134 based on such information.

Figure 2:
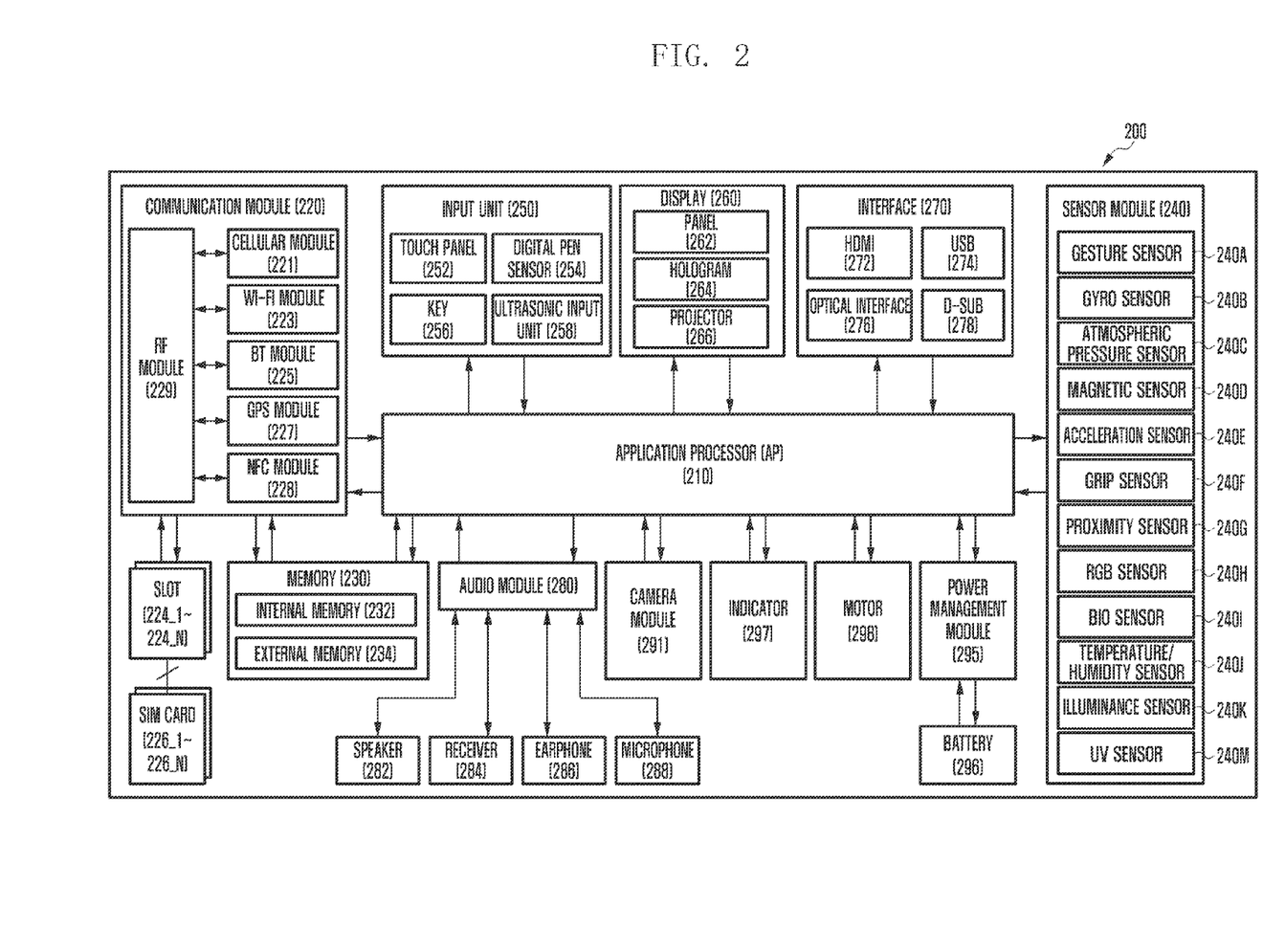
FIG. 2 is a block diagram of an electronic device according to an embodiment of the present disclosure.

FIG. 2 is a block diagram illustrating an electronic device 200 according to an embodiment of the present disclosure.

The electronic device 200 may form, for example, the whole or part of the electronic device 100 shown in FIG. 1.

Referring to FIG. 2, the electronic device 200 may include at least one Application Processor (AP) 210, a communication module 220, at least one Subscriber Identity Module (SIM) card 226 (i.e., 226_1~226_N), a corresponding slot 224 for each SIM card 226 (i.e., 224_1~224_N), a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 100) through the network. According to an embodiment, the communication module 220 may include therein a cellular module 221, a WiFi module 223, a BT module 225, a GPS module 227, an NFC module 228, and a Radio Frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include (not shown) a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227, and the NFC module 228 may include a processor for processing data transmitted or received therethrough. Although FIG. 2 shows the cellular module 221, the WiFi module 223, the BT module 225, the GPS module 227, and the NFC module 228 as different blocks, at least part of them may be contained in a single Integrated Circuit (IC) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227, and the NFC module 228 may be formed as a single SoC.

The RF module 229 may transmit and receive data, e.g., RF signals or any other electric signals. Although not shown, the RF module 229 may include a transceiver, a Power Amp Module (PAM), a frequency filter, a Low Noise Amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The at least one SIM card 224_1 to 224_N may be a specific card formed of SIM and may be inserted into a corresponding slot 225_1 to 225_N formed at a certain place of the electronic device. The at least one SIM card 224_1 to 224_N may contain therein an Integrated Circuit Card Identifier (ICCID) or an International Mobile Subscriber Identity (IMSI).

The memory 230 (e.g., the memory 130) may include an internal memory 232 and an external memory 234. The internal memory 232 may include, for example, at least one of a volatile memory (e.g., Dynamic RAM (DRAM), Static RAM (SRAM), Synchronous DRAM (SDRAM), etc.) or a nonvolatile memory (e.g., One Time Programmable Read Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment, the internal memory 232 may have the form of a Solid State Drive (SSD). The external memory 234 may include a flash drive, e.g., Compact Flash (CF), Secure Digital (SD), Micro Secure Digital (Micro-SD), Mini Secure Digital (Mini-SD), eXtreme Digital (xD), memory stick, or the like. The external memory 234 may be functionally connected to the electronic device 200 through various interfaces. According to an embodiment, the electronic device 200 may further include (not shown) a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illuminance sensor 240K, and an ultraviolet (UV) sensor 240M. Additionally or alternatively, the sensor module 240 may include (not shown), e.g., an E-nose sensor, an electromyography (EMG) sensor, an electroencephalogram (EEG) sensor, electrocardiogram (ECG) sensor, an infrared (IR) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In the case of a capacitive type touch panel, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, Liquid Crystal Display (LCD), Light Emitting Diode (LED), Organic LED (OLED), Active Matrix OLED (AM-OLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include (not shown) a control circuit for controlling the panel 262, the hologram 264, and the projector 266.

The interface 270 may include, for example, an High-Definition Multimedia Interface (HDMI) 272, a USB 274, an optical interface 276, or a D-subminiature (D-sub) 278. The interface 270 may be contained, for example, in the communication interface 160 shown in FIG. 1. Additionally or alternatively, the interface 270 may include, for example, a Mobile High-definition Link (MHL) interface, an SD card/Multi-Media Card (MMC) interface, or an Infrared Data Association (IrDA) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include (not shown) at least one image sensor (e.g., a front sensor or a rear sensor), a lens, an Image Signal Processor (ISP), or a flash (e.g., LED or xenon lamp).

The power management module 295 may manage electric power of the electronic device 200. Although not shown, the power management module 295 may include, for example, a Power Management Integrated Circuit (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of Digital Multimedia Broadcasting (DMB), Digital Video Broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of Application-Specific Integrated Circuit (ASIC) chip, Field-Programmable Gate Arrays (FGPAs), and programmable-logic device, which have been known or are to be developed.

In various embodiments, the electronic device 101, 104, or 200 may include a heterogeneous multi-core processor having at least two cores of different types. The multi-core processor may be composed of different processing units such as X86, X64, ARM, GPU, and DSP.

In various embodiments, a "processor" includes at least one core, and may be defined as an independent entity capable of cooperating with other components of the device.

In various embodiments, a "processing unit" may be defined as a minimum entity that can interpret and execute instructions in a processor, and may be used interchangeably with a "core".

Next, a multiprocessor system and an electronic device 101, 104, or 200 having a multiprocessor system are described as various embodiments with reference to the drawings.

Figure 3:
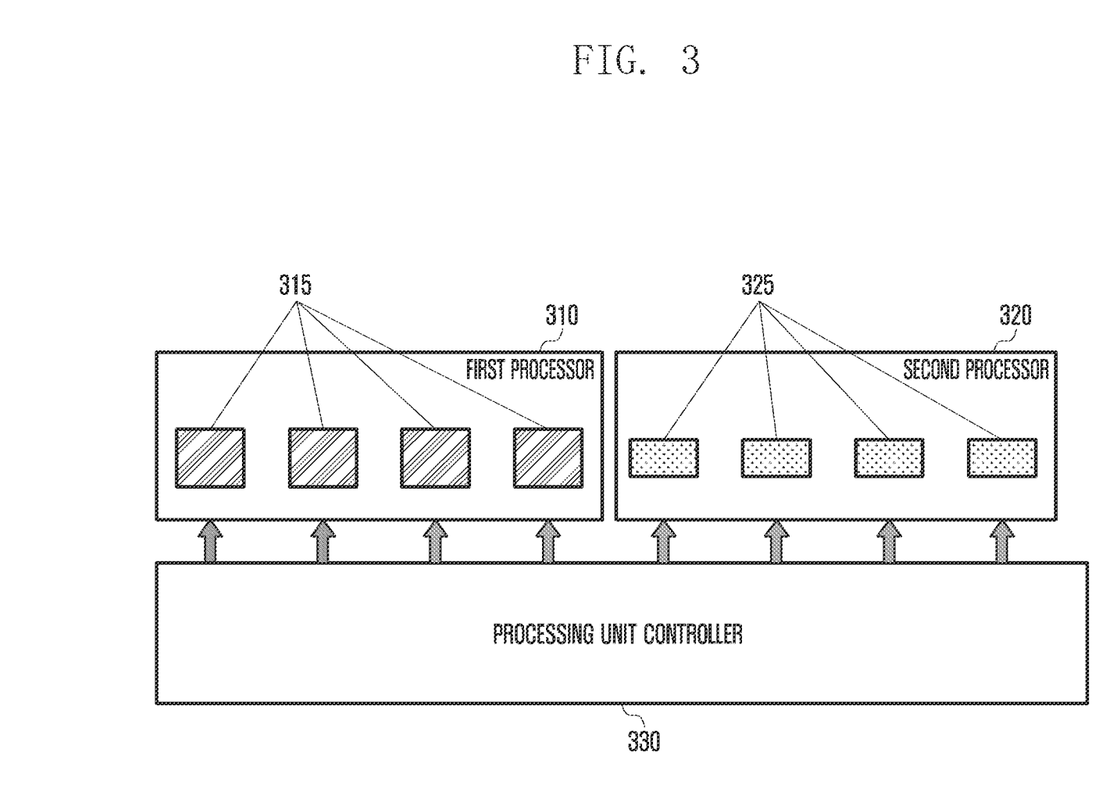
FIG. 3 illustrates a configuration of processing units in an electronic device according to an embodiment of the present disclosure.

FIG. 3 illustrates a configuration of processing units 315 and 325 in an electronic device according to an embodiment of the present disclosure.

Referring to FIG. 3, the processor 120 or 210 may include first processing units 315, second processing units 325, and a processing unit controller 330.

The processor 120 or 210 may include one or more processing units. In various embodiments, the processing units may be represented as the first processing units 315 and second processing units 325. That is, a first processing unit 315 and a second processing unit 325 may each be a minimum entity that can execute instructions of a task.

In one embodiment, the first processing units 315 and the second processing units 325 may be processing units categorized according to performance or power. The first processing units 315 and the second processing units 325 may be, for example, a dual-core unit, triple-core unit, quad-core unit, hexa-core unit, or octa-core unit. The first processing units 315 and the second processing units 325 may be high-performance big cores (e.g. Cortex-A15) or low-power little cores (e.g. Cortex-A7). In FIG. 3, although eight processing units are shown (octa-core) for illustration, the present disclosure is not limited thereto.

In various embodiments, the first processor 310 may include the first processing units 315 as a minimum entity capable of executing instructions of a task, and the second processor 320 may include the second processing units 325 as a minimum entity capable of executing instructions of a task.

Here, a task may refer to an executable job with a separate program section (e.g. code, variable, stack, or the like). A task may correspond to a user request. In an embedded system, a task may be a minimum entity for scheduling. Scheduling may involve assigning priorities to tasks to be processed.

Figure 4:
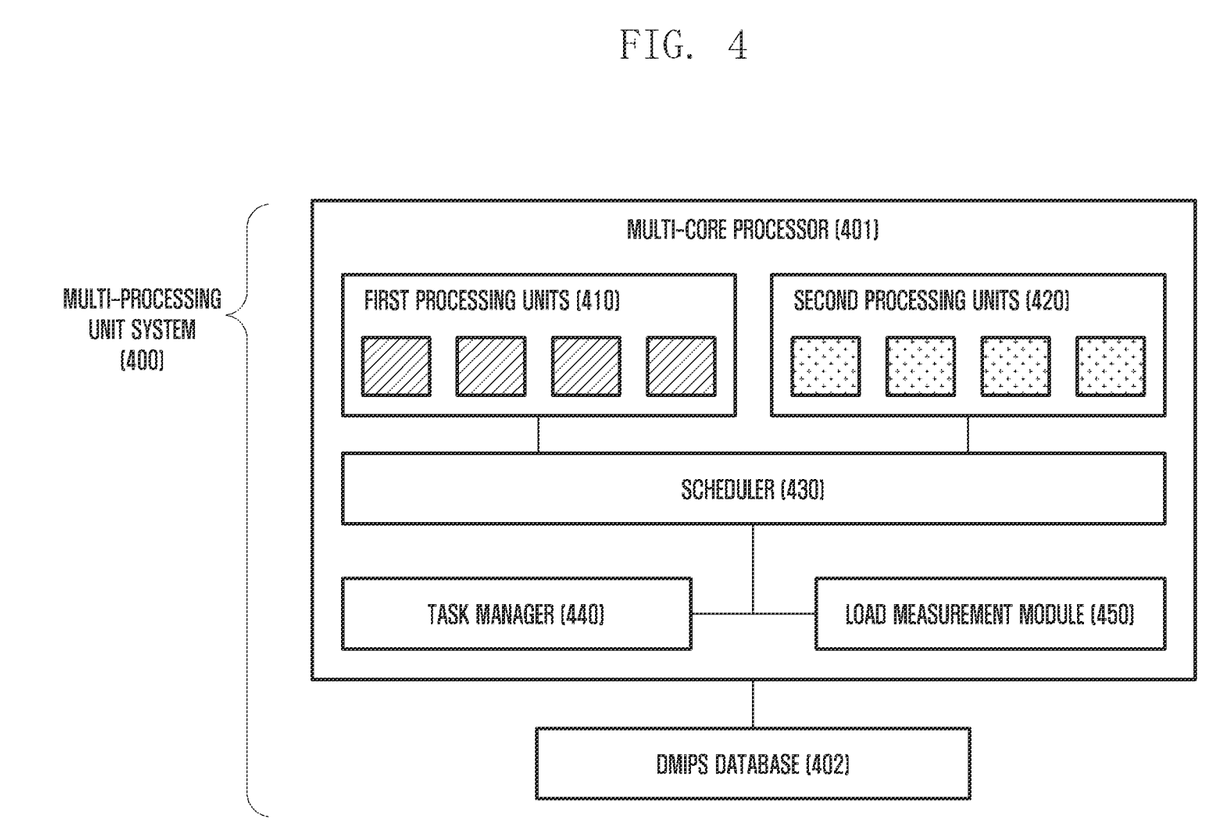
FIG. 4 illustrates a configuration of a multi-processing unit system in an electronic device according to an embodiment of the present disclosure.

FIG. 4 illustrates a configuration of a multi-processing unit system 400 in an electronic device according to an embodiment of the present disclosure.

Referring to FIG. 4, the multi-processing unit system 400 may include a multi-core processor 401 and a Dhrystone million instructions per second (DMIPS) database 402.

The multi-core processor 401 may include one or more first processing units 410, one or more second processing units 420, a scheduler 430, a task manager 440, and a load measurement module 450.

Each of the first processing units 410 and second processing units 420 may process a task assigned by the scheduler 430. Here, a task refers to an executable job with a separate program section (e.g., code and stack).

In one embodiment, the first processing units 410 may be high-performance big cores (e.g. Cortex-A15). The second processing units 420 may be low-power little cores (e.g. Cortex-A7). However, the present disclosure is not limited thereto, and the first processing units 410 and the second processing units 420 may be cores of the same type.

Each of the first processing units 410 and second processing units 420, as a core, may process a task assigned by the scheduler 430. The scheduler 430 may assign a task to a first processing unit 410 or a second processing unit 420 according to the task load. That is, the scheduler 430 may select a core among the cores of the multi-core processor 401 and assign a task to the selected core.

In one embodiment, when a new task is created, the scheduler 430 may select a low-power core (e.g. one of the second processing units 420) and assign the new task to the selected core for processing.

When the load of a task executing on a second processing unit 420 is greater than or equal to a threshold value, the scheduler 430 may migrate the task to one of the first processing units 410. When the load of a task executing on a first processing unit 410 becomes less than the threshold value, the scheduler 430 may migrate the task to one of the second processing units 420.

The scheduler 430 may deactivate one of the second processing units 420 to which a task to be migrated is assigned (source core), activate one of the first processing units 410 (target core), and migrate the task from the deactivated source core to the activated target core.

In response to an execution request for a task, the scheduler 430 may assign the task to a high-performance core (e.g. one of the first processing units 410) when the load of the task is above the threshold value, and assign the task to a low-power core (e.g. one of the second processing units 420) when the load of the task is below the threshold value.

The task manager 440 may create, remove and change a task according to a user request or preset schedule. The task manager 440 may monitor task processing of the first processing units 410 and the second processing units 420. For example, when the user executes an application in the electronic device 101, the task manager 440 may create a task corresponding to the application and transfer task creation information to the scheduler 430. The scheduler 430 may assign the created task to one of the first processing units 410 and the second processing units 420 according to schedule settings, causing the task to be processed.

The task manager 440 may monitor the load of a task assigned to the first processing units 410 and second processing units 420 and check whether the load of the task is above the threshold value. When the load of a task executing on the first processing units 410 becomes less than the threshold value, the task manager 440 may notify this to the scheduler 430. When the load of a task executing on the second processing units 420 becomes greater than or equal to the threshold value, the task manager 440 may notify this to the scheduler 430.

The load measurement module 450 may measure the load of a task assigned to a first processing unit 410 or a second processing unit 420. The load measurement module 450 may identify the frequency of each core to measure the load of a task assigned to the core. The load measurement module 450 may measure the load of a task by use of raw load and a scaling factor.

Figure 5A:
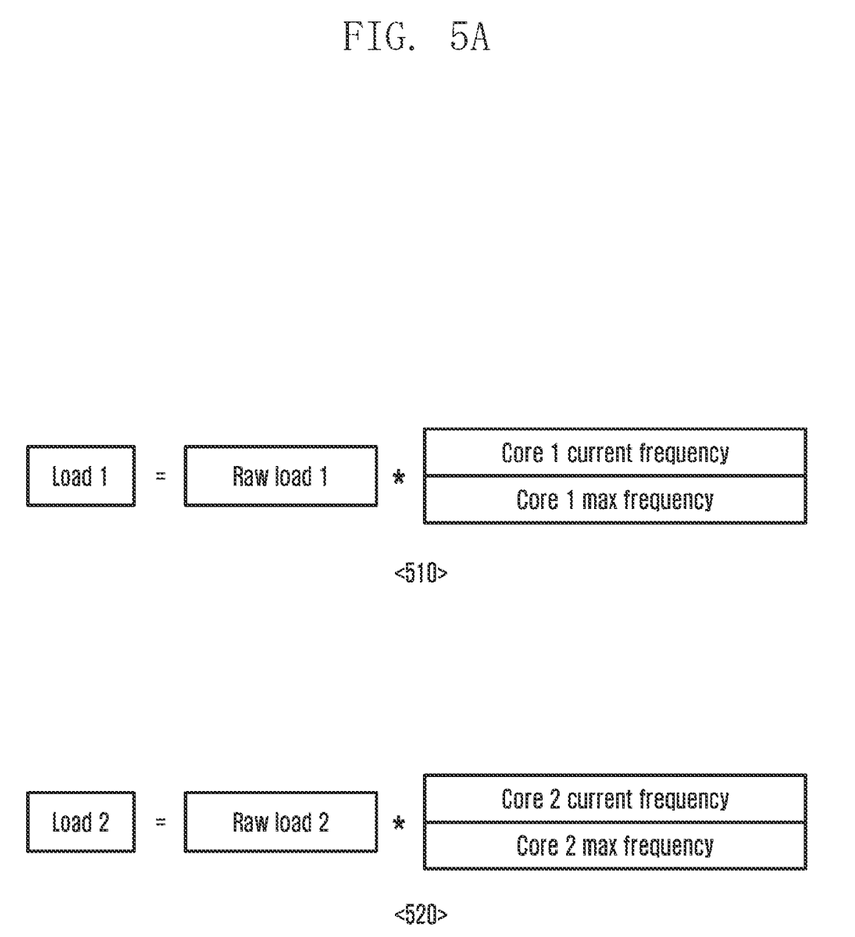
FIG. 5A illustrates measurement of task load using a frequency-based scaling factor according to an embodiment of the present disclosure.

As shown in FIG. 5A, the scaling factor may be given by the frequency of each core. That is, to measure the load of a particular core (e.g. a first processing unit 410) due to tasks, the scaling factor may be set to the value of the current frequency of the core divided by the maximum frequency of the core (current frequency/maximum frequency).

Meanwhile, the frequency-based scaling factor may fail to accurately reflect the current performance of a core. Cores operating at the same frequency may significantly differ in terms of task processing performance according to their types. For example, although a first processing unit 410 (e.g. Cortex-A15) and a second processing unit 420 (e.g. Cortex-A7) operate at the same frequency of 1.3 GHz, task processing performance of the first processing unit 410 may be much higher than that of the second processing unit 420. Hence, if the first processing unit 410 and the second processing unit 420 execute the same task with a given raw load, the first processing unit 410 may operate at a frequency lower than that of the second processing unit 420.

In one embodiment, when a task whose load exceeds the threshold value is migrated from a second processing unit 420 to a first processing unit 410, as the first processing unit 410 is more powerful than the second processing unit 420, the first processing unit 410 may process the task at a frequency lower than that of the second processing unit 420. In this case, as the current frequency becomes smaller, the scaling factor becomes smaller accordingly. This may cause load inversion where the task load falls below the threshold value. If only one threshold value is defined for task migration, the task may again be migrated from the first processing unit 410 to the second processing unit 420 owing to load inversion. To prevent repeated migration due to load inversion, it is necessary to define multiple threshold values (e.g.

first and second threshold values) for down migration (from a first processing unit to a second processing unit) and up migration (from a second processing unit to a first processing unit).

To cope with load inversion, the load measurement module 450 may use a scaling factor reflecting actual core performance. For example, the scaling factor may use the DMIPS value other than the frequency for task load measurement. The DMIPS value is related to the number of instructions executed per second and may be used as a representative metric for core performance.

Figure 5B:
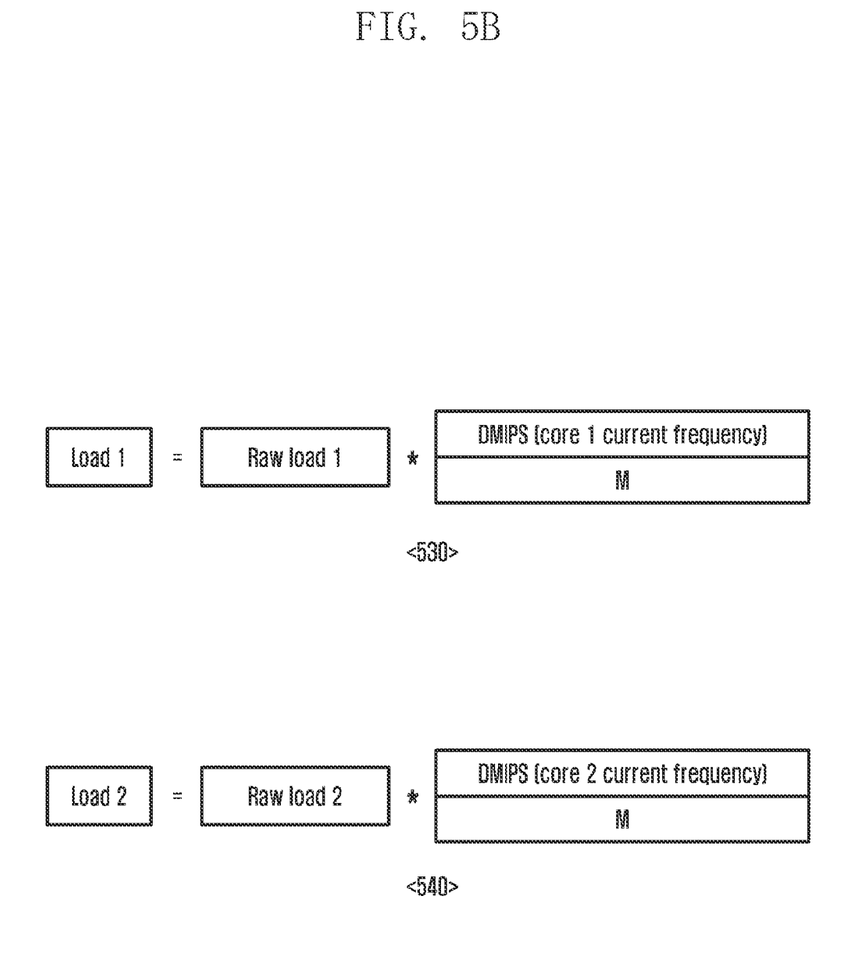
FIG. 5B illustrates measurement of task load using a Dhrystone million instructions per second (DMIPS)-based scaling factor according to an embodiment of the present disclosure.

A DMIPS-based scaling factor may be defined as shown in FIG. 5B. For a particular core, the current DMIPS value may be obtained by entering a query with the current frequency into the DMIPS database 402.

The DMIPS database 402 may store DMIPS values corresponding to frequencies of cores. That is, the DMIPS database 402 may store types of cores supported by the processor, ranges of frequencies supported by the cores, and DMIPS values for each core and frequency. The DMIPS database 402 may also store M as the maximum among all stored DMIPS values.

The load measurement module 450 may obtain the DMIPS value of a given core by use of the current frequency of the core and the DMIPS database 402. The load measurement module 450 may also obtain the maximum DMIPS value (M) from the DMIPS database 402. The load measurement module 450 may determine the scaling factor by use of the current DMIPS value and M, and measure the task load of the core handling tasks using the scaling factor.

In the event that the task load is measured using a DMIPS value, as migration is performed based on actual core performance, movement of a task from a second processing unit 420 to a first processing unit 410 does not cause a significant change in the scaling factor, preventing load inversion. Hence, it is unnecessary to define a pair of separate threshold values for down migration (from a first processing unit to a second processing unit) and up migration (from a second processing unit to a first processing unit). One threshold value suffices to prevent load inversion in task scheduling.

When the task load measured in DMIPS values equals or exceeds the threshold value or falls below the threshold value, the load measurement module 450 may notify this to the scheduler 430 and the task manager 440.

In the multi-processing unit system, the scheduler 430 may assign a task to one of a first processing unit 410 and a second processing unit 420.

In one embodiment, the scheduler 430 may be configured to assign a newly created task to one of the second processing units 420 for processing. When the load of a task executing on one of the second processing units 420 rises above the threshold value, the scheduler 430 may migrate the task whose load exceeds the threshold value to one of the first processing units 410.

When the load of a task executing on one of the first processing units 410 falls below the threshold value, the scheduler 430 may migrate the task whose load falls below the threshold value to one of the second processing units 420.

The task manager 440 may monitor the load measurement module 450 to identify a task load change. When the task load equals or exceeds the threshold value or falls below the threshold value, the task manager 440 may notify this to the scheduler 430.

According to various embodiments, the electronic device may include first processing units; second processing units; a scheduler to assign a task to one of the first processing units; and a load measurement module to measure the task load, wherein the scheduler may control migration of a task to one of the second processing units based on the task load.

The electronic device may further include a task manager to check whether the task load equals or exceeds a preset threshold value or falls below the threshold value and notify a task state change to the scheduler.

When the load of a task equals or exceeds the threshold value, the scheduler may assign the task to one of the second processing units. When the load of a task falls below the threshold value, the scheduler may assign the task to one of the first processing units.

The load measurement module may measure the task load based on a scaling factor based on the DMIPS value.

The load measurement module may determine a DMIPS-based scaling factor based on the type of a core to which a given task is assigned and the current frequency of the core.

The load measurement module may obtain a current DMIPS value from a DMIPS database according to the core type and current frequency, obtain the maximum DMIPS value among all DMIPS values stored in the DMIPS database, and set the DMIPS-based scaling factor to the value of the current DMIPS value divided by the maximum DMIPS value.

The preset threshold value may be a single-value threshold or a multi-value threshold.

Each of the first processing units and second processing units may be a minimum entity that can execute instructions of a task.

The first processing units and second processing units may constitute a single processor.

The first processing units may constitute a first processor and the second processing units may constitute a second processor different from the first processor.

FIG. 5A illustrates measurement of task load using a frequency-based scaling factor according to an embodiment of the present disclosure.

Referring to FIG. 5A, the task load may be measured using a frequency-based scaling factor.

As indicated by reference 510, a scaling factor for a core (e.g. one of the first processing units 410) is illustrated. Here, the scaling factor is given by the value of the current frequency of the core divided by the maximum frequency of the core (e.g., Cortex-A15).

As indicated by reference 520, a scaling factor for a core (e.g. one of the second processing units 420) is illustrated. Here, the scaling factor is given by the value of the current frequency of the core divided by the maximum frequency of the core (e.g., Cortex-A7).

The load measurement module 450 may measure the load of a task assigned to a first processing unit 410 or to a second processing unit 420 by use of the corresponding scaling factor.

FIG. 5B illustrates measurement of task load using a DMIPS-based scaling factor according to an embodiment of the present disclosure.

Referring to FIG. 5B, a DMIPS-based scaling factor may be determined on the basis of the current DMIPS value of a core and the maximum DMIPS value (M).

As indicated by reference 530, a DMIPS-based scaling factor for a core (e.g. one of the first processing units 410) is illustrated. Here, the scaling factor is given by the value of the current DMIPS value of the core (e.g., Cortex-A15) divided by the maximum DMIPS value (M) stored in the DMIPS database 402.

As indicated by reference 540, a DMIPS-based scaling factor for a core (e.g. one of the second processing units 420) is illustrated. Here, the scaling factor is given by the value of the current DMIPS value of the core (e.g., Cortex-A7) divided by the maximum DMIPS value (M) stored in the DMIPS database 402.

The load measurement module 450 may use the DMIPS-based scaling factor reflecting actual core performance to prevent load inversion. For a core, the DMIPS value may be obtained using the current frequency of the core and the task load may be measured using the DMIPS-based scaling factor.

Figure 6:
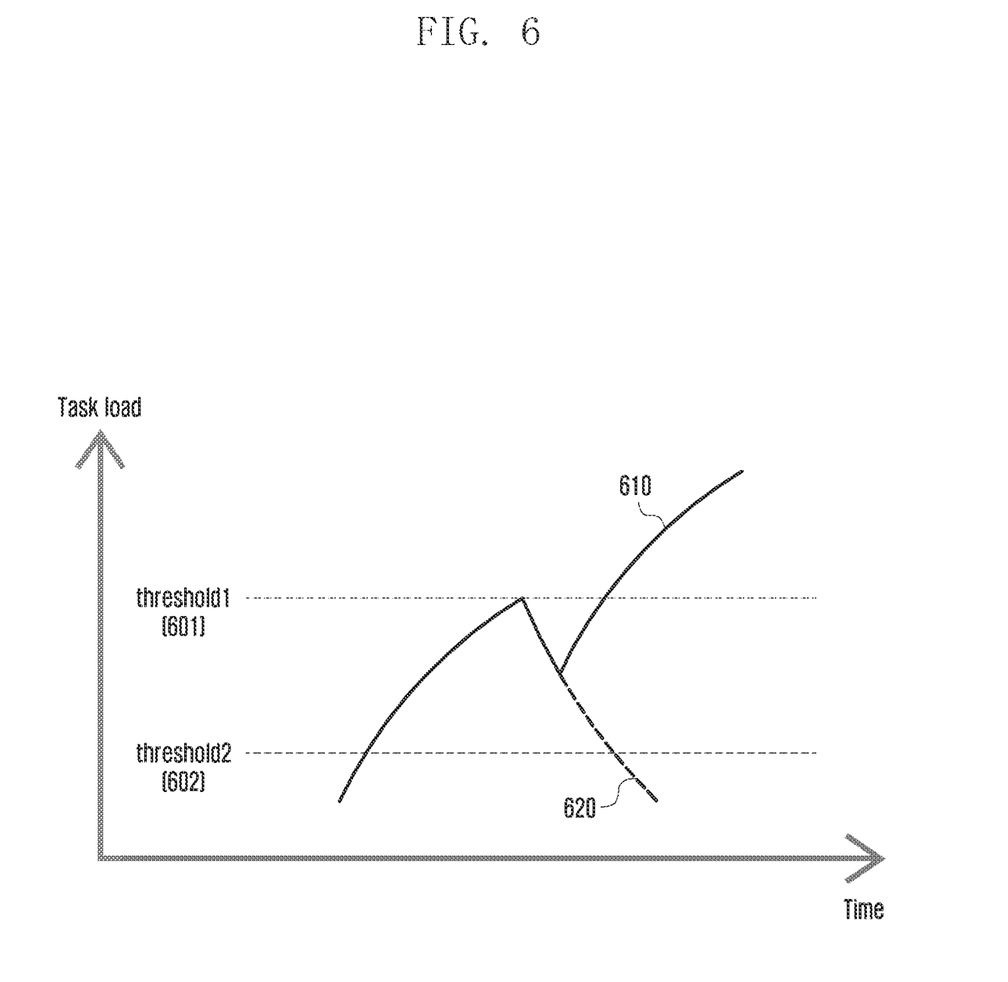
FIG. 6 illustrates task migration when task load is measured using a frequency-based scaling factor according to an embodiment of the present disclosure.

FIG. 6 depicts task migration when task load is measured using a frequency-based scaling factor according to an embodiment of the present disclosure.

When the load is measured using a frequency-based scaling factor, the load may decrease immediately after a first threshold 601 (threshold 1) is reached. This is a phenomenon that may occur when load measurement fails to accurately reflect the current performance of the core. Specifically, cores operating at the same frequency may significantly differ in terms of task processing performance according to their types. For example, although a first processing unit 410 (e.g., Cortex-A15) and a second processing unit 420 (e.g., Cortex-A7) operate at the same frequency of 1.3 GHz, task processing performance of the first processing unit 410 may be much higher than that of the second processing unit 420. Hence, if the first processing unit 410 and the second processing unit 420 execute the same task with a given raw load, the first processing unit 410 may operate at a frequency lower than that of the second processing unit 420.

Referring to FIG. 6, when the task load rises above the first threshold 601, the task may be migrated from a second processing unit 420 to a first processing unit 410. As the first processing unit 410 may execute the task at a frequency lower than that of the second processing unit 420, the current frequency used for computing the frequency-based scaling factor may decrease. Hence, the frequency-based scaling factor may also be decreased, lowering the computed task load. This may cause load inversion where the task load falls below the threshold value. As shown in FIG. 6, the task load decreases after the first threshold 601 is reached.

When the first threshold 601 is used as a single reference for task migration, the task may be migrated from the first processing unit 410 to a second processing unit 420 (down migration) owing to load inversion.

To prevent repeated migration due to load inversion, it is necessary to define a pair of threshold values for down migration (from a first processing unit to a second processing unit) and up migration (from a second processing unit to a first processing unit).

In FIG. 6, two threshold values (first threshold 601 and second threshold 602) are used. The first threshold 601 may be used for up migration of a task, and the second threshold 602 may be used for down migration of a task.

In one embodiment, the spacing between the first threshold 601 and the second threshold 602 may be appropriately maintained so as to prevent down migration due to load inversion. As indicated by reference 610, the up-migrated task may continue to execute on the first processing unit 410.

In another embodiment, when the spacing between the first threshold 601 and the second threshold 602 is too narrow, load inversion may occur, causing down migration of a task as indicated by reference 620.

Figure 7:
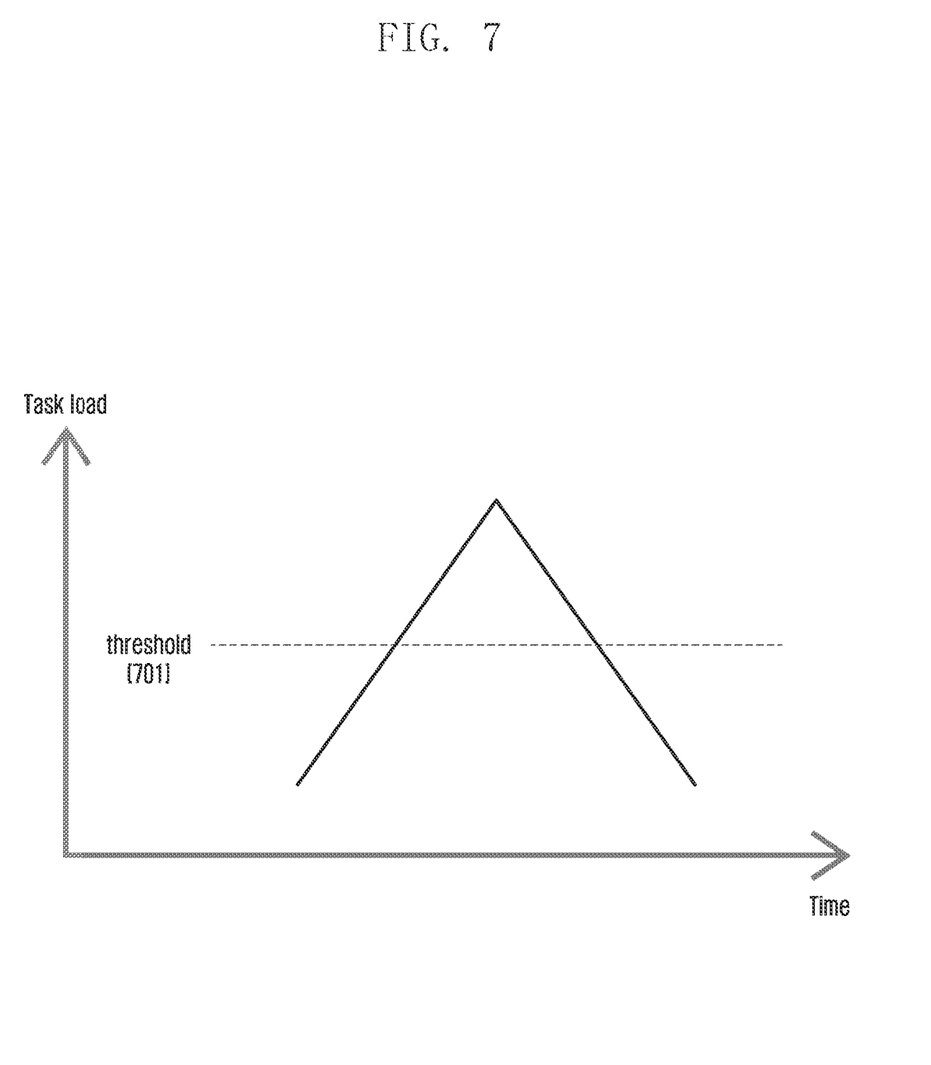
FIG. 7 illustrates task migration when task load is measured using a DMIPS-based scaling factor according to an embodiment of the present disclosure.

FIG. 7 illustrates task migration when task load is measured using a DMIPS-based scaling factor according to an embodiment of the present disclosure.

A DMIPS-based scaling factor may be defined as shown in FIG. 5B. The current DMIPS value of a particular core and the maximum DMIPS value (M) may be obtained by use of the current frequency of the core and the DMIPS database 402.

In the event that the task load is measured using a DMIPS value, migration may be performed based on actual core performance. Movement of a task from a second processing unit 420 to a first processing unit 410 does not cause a significant change in the DMIPS-based scaling factor, preventing load inversion.

Referring to FIG. 7, unlike FIG. 6 wherein a pair of threshold values (e.g. threshold 1 (601) and threshold 2 (602)) for down migration (from a first processing unit to a second processing unit) and up migration (from a second processing unit to a first processing unit) are defined, it is possible to schedule tasks using a single threshold value (e.g. threshold 701).

Referring to FIG. 7, when the task load equals or exceeds the threshold 701 set based on a DMIPS value or falls below the threshold 701, task migration may be performed.

Figure 8:
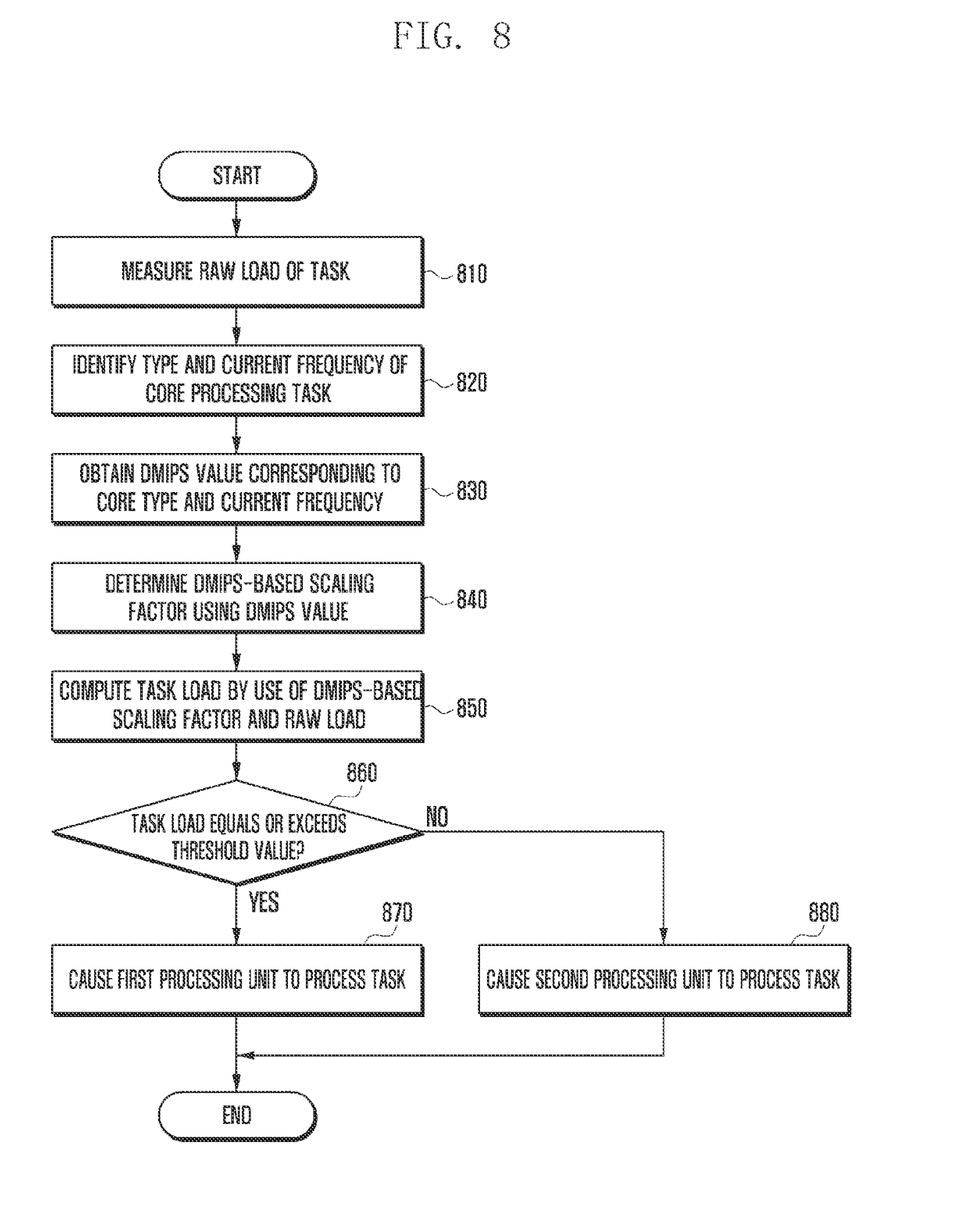
FIG. 8 is a flowchart of a method for task load measurement and task handling with core switching according to an embodiment of the present disclosure.

FIG. 8 is a flowchart of a method for task load measurement and task handling with core switching in an electronic device 200 according to an embodiment of the present disclosure.

At operation 810, the electronic device 200 measures the raw load of a task executing on a core. At operation 820, the electronic device 200 identifies the type (e.g. Cortex-A7 or Cortex-A15) and current frequency of the core processing the task. At operation 830, the electronic device 200 obtains the DMIPS value corresponding to the core type and current frequency from the DMIPS database 402. At operation 840, the electronic device 200 determines a DMIPS-based scaling factor using the obtained DMIPS value. At operation 850, the electronic device 200 computes the task load by use of the DMIPS-based scaling factor and raw load. At operation 860, the electronic device 200 compares the task load with the preset threshold value. If the task load equals or exceeds the threshold value, at operation 870, the electronic device 200 executes the task on one of the first processing units 410. If the task load falls below the threshold value, at operation 880, the electronic device 200 executes the task on one of the second processing units 420.

According to various embodiments of the present disclosure, a task scheduling method for an electronic device may include: assigning a task to one of first processing units functionally connected to the electronic device; measuring the task load of the task; and controlling migration of the task to one of second processing units based on the task load.

The task load may be measured using a scaling factor based on the DMIPS value.

Measuring the task load may include: identifying the type and current frequency of a core to which the task is assigned; and obtaining the DMIPS-based scaling factor based on the core type and current frequency.

Obtaining the DMIPS-based scaling factor may include: obtaining a current DMIPS value corresponding to the core type and current frequency by referring to a DMIPS database; and dividing the current DMIPS value by the maximum DMIPS value stored in the DMIPS database.

Controlling migration of the task comprises assigning, when the task load equals or exceeds a preset threshold value, the task to one of the second processing units; and assigning, when the task load falls below the threshold value, the task to one of the first processing units.

The preset threshold value may be a single-value threshold other than a two-value threshold.

Each of the first processing units and second processing units may be a minimum entity that can execute instructions of a task.

The first processing units and second processing units may constitute a single processor.

The first processing units may constitute a first processor and the second processing units may constitute a second processor distinct from the first processor.

At least part of the method (e.g., operations) or system (e.g., modules or functions) according to the embodiments of the present disclosure can be implemented with instructions as programming modules that are stored in a non-transitory computer-readable storage media. One or more processors (e.g., processor 210) can execute instructions, thereby performing the functions. An example of the non-transitory computer-readable storage media may be memory 230. At least part of the programming modules can be implemented (executed) by processor 210. At least part of the programming module may include modules, programs, routines, sets of instructions or processes, etc., in order to perform one or more functions.

Examples of non-transitory computer-readable media include magnetic media, such as hard disks, floppy disks, and magnetic tape; optical media such as Compact Disc ROM (CD-ROM) disks and DVD; magneto-optical media, such as floptical disks; and hardware devices that are specially configured to store and perform program instructions (e.g., programming modules), such as ROM, random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

According to various embodiments of the present disclosure, a storage medium storing program instructions executable by at least one processor wherein the program instructions are configured to, when executed, assign a task to one of first processing units functionally connected to an electronic device, measure the task load of the task, and control migration of the task to one of second processing units based on the task load.

In a feature of the present disclosure, the DMIPS value serving as a representative metric for core performance is used for task load measurement. Hence, it is possible to perform task scheduling in consideration of actual core performance. Switching between cores through task scheduling reflecting actual core performance may further enhance application execution performance.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for scheduling tasks in an electronic device, the method comprising:
    assigning, by a scheduler, a task to one of first processing units functionally connected to the electronic device;
    measuring, by a load measurement module, a task load of the task by using a scaling factor based on a Dhrystone million instructions per second (DMIPS) value; and
    controlling, by the scheduler, migration of the task to one of second processing units based on the task load of the task,
    wherein the measuring of the task load of the task comprises:
        identifying, by the load measurement module, a type and a current frequency of a core to which the task is assigned, and
        obtaining, by the load measurement module, a DMIPS-based scaling factor based on the type of the core and the current frequency of the core, and
    wherein the obtaining of the DMIPS-based scaling factor comprises:
        obtaining, by the load measurement module, a current DMIPS value corresponding to the type of the core and the current frequency of the core by referring to a DMIPS database, and
        obtaining, by the load measurement module, the DMIPS-based scaling factor by dividing the current DMIPS value by a maximum DMIPS value stored in the DMIPS database.

2. The method of claim 1, wherein the controlling of the migration of the task comprises:
    assigning the task to one of the second processing units when the task load of the task equals or exceeds a preset threshold value, and
    assigning the task to one of the first processing units when the task load of the task falls below the preset threshold value.

3. The method of claim 2, wherein the preset threshold value is a single-value threshold.

4. The method of claim 1, wherein each of the first processing units and the second processing units is a minimum entity capable of executing instructions of the task.

5. The method of claim 1, wherein the first processing units and the second processing units constitute a single processor.

6. The method of claim 1, wherein the first processing units constitute a first processor, and wherein the second processing units constitute a second processor distinct from the first processor.

7. A non-transitory computer readable storage medium storing program instructions implementing a task scheduling method of claim 1 for an electronic device.

8. An electronic device comprising:
    first processing units;
    second processing units;
    a scheduler configured to assign a task to one of the first processing units; and
    a load measurement module configured to measure a task load of the task by using a scaling factor based on a Dhrystone million instructions per second (DMIPS) value,
    wherein the scheduler controls migration of the task to one of the second processing units based on the task load of the task, and
    wherein the load measurement module is further configured to:
        identify a type and a current frequency of a core to which the task is assigned, obtain a DMIPS-based scaling factor based on the type of the core and the current frequency of the core, obtain a current DMIPS value corresponding to the type of the core and the current frequency of the core by referring to a DMIPS database, and obtain the DMIPS-based scaling factor by dividing the current DMIPS value by a maximum DMIPS value stored in the DMIPS database.

9. The electronic device of claim 8, further comprising a task manager configured to:

check whether the task load of the task equals or exceeds a preset threshold value or falls below the preset threshold value, and notify a task state change to the scheduler.

10. The electronic device of claim 9, wherein the scheduler is further configured to:

assign the task to the one of the second processing units when the task load of the task equals or exceeds the preset threshold value, and assign the task to one of the first processing units when the task load of the task falls below the preset threshold value.

11. The electronic device of claim 10, wherein the preset threshold value is a single-value threshold.

12. The electronic device of claim 8, wherein each of the first processing units and the second processing units is a minimum entity capable of executing instructions of the task.

13. The electronic device of claim 8, wherein the first processing units and the second processing units constitute a single processor.

14. The electronic device of claim 8, wherein the first processing units constitute a first processor, and wherein the second processing units constitute a second processor distinct from the first processor.

* * * * *